UNITED STATES PATENT OFFICE.

GEO. F. UDELL AND HENRY MAYELL, OF ALBANY, NEW YORK.

LEATHER AND RUBBER SOLING.

Specification forming part of Letters Patent No. 41,246, dated January 12, 1864.

*To all whom it may concern:*

Be it known that we, GEORGE F. UDELL and HENRY MAYELL, of the city of Albany, State of New York, have invented a new and useful article of manufacture; and we declare the following description to be a full and complete one of our said article.

Our invention is intended for use in the making of soling for boots and shoes, or for any purpose in which leather protected over its whole surface by india-rubber covering may be needed in arts or manufactures. It is made by the following process: Entire sides or large pieces of sole-leather are to be properly skived (split) so as to be of even thickness. Then one side of it is to be covered with several coats of cement made of india-rubber dissolved in spirits of turpentine, naphtha, or any competent solvent. Then "india-rubber soling" (known as such to the trade) is to be treated with the same kind of cement in the same manner. The pieces are to be laid together and then subjected by rollers or otherwise to a strong pressure, by means of which they will become firmly united together, making a firm and strong article for the purposes mentioned.

We are aware that bits of rubber soling are frequently applied to the soles of boots and shoes to protect the wearer from slipping upon icy surfaces. We do not claim any special application of the article described, nor of its parts; nor do we claim the process by which it is made; but We do claim—

The combination of leather in sides or large sheets with india-rubber soling, as described in the above specification, being a new and useful article of manufacture.

GEORGE F. UDELL.
HENRY MAYELL.

Witnesses:
RICHD. VARICK DEWITT,
JAMES B. SANDERS.